(12) United States Patent
Niebling et al.

(10) Patent No.: US 7,287,908 B2
(45) Date of Patent: Oct. 30, 2007

(54) ARRANGEMENT OF A SENSOR ON A WHEEL BEARING UNIT

(75) Inventors: Peter Niebling, Bad Kissingen (DE); Jens Heim, Schweifurt (DE); Heinrich Hofmann, Schweinfurt (DE); Darius Dlugai, Schweinfurt (DE); Roland Langer, Schwanfeld (DE)

(73) Assignee: FAG Kugelfischer AG (DE)

( * ) Notice: Subject to any disclaimer, the term of this patent is extended or adjusted under 35 U.S.C. 154(b) by 55 days.

(21) Appl. No.: 10/924,033

(22) Filed: Aug. 23, 2004

(65) Prior Publication Data

US 2005/0047692 A1    Mar. 3, 2005

(30) Foreign Application Priority Data

Aug. 25, 2003  (DE) ................... 103 38 959

(51) Int. Cl.
*F16C 19/08*  (2006.01)
(52) U.S. Cl. .................... 384/448
(58) Field of Classification Search ............... 384/448, 384/544, 446; 324/173, 174
See application file for complete search history.

(56) References Cited

U.S. PATENT DOCUMENTS

| | | | |
|---|---|---|---|
| 5,143,458 A | * | 9/1992 | Alff et al. ............... 384/448 |
| 5,695,289 A | | 12/1997 | Ouchi et al. ............. 384/448 |
| 5,873,658 A | | 2/1999 | Message et al. .......... 384/448 |
| 5,997,182 A | | 12/1999 | Brown .................... 384/448 |
| 2005/0175267 A1 | * | 8/2005 | Joki et al. ............... 384/448 |

FOREIGN PATENT DOCUMENTS

| | | |
|---|---|---|
| DE | 689 03 331 T2 | 3/1993 |
| DE | 41 10 165 C2 | 5/1995 |
| DE | 691 06 424 T2 | 7/1995 |
| DE | 196 25 489 A1 | 1/1998 |
| DE | 196 44 744 A1 | 5/1998 |
| EP | 0 596 873 A2 | 5/1994 |

OTHER PUBLICATIONS

Evolution 1995, Heft 4, pp. 24-27, (including Abb. 2).
System Partners 2002, Sonderausgabe von ATZ, UTZ, pp. 48-51.
German Search Report. (no date).

* cited by examiner

*Primary Examiner*—Lenard A. Footland
(74) *Attorney, Agent, or Firm*—Ostrolenk, Faber, Gerb & Soffen, LLP

(57) ABSTRACT

An arrangement of a sensor on a wheel bearing unit, the sensor is fixed to an outer wheel bearing ring of the wheel bearing unit, and at the sensor is located opposite an encoder of the wheel bearing unit which encoder can rotate with respect to the sensor about an axis of rotation of the wheel bearing unit. The wheel bearing unit has at least a first row of roller bodies and has a second row of roller bodies which is adjacent to the first row in the axial direction of the axis of rotation. The bearing ring engages at the same time around at least one of the rows.

12 Claims, 11 Drawing Sheets

ARRANGEMENT OF A SENSOR ON A WHEEL BEARING UNIT

FIELD OF THE INVENTION

The present invention relates to an arrangement of a sensor on a wheel bearing unit in which the sensor is fixed to an outer wheel bearing ring of the wheel bearing unit, and at the same time is located opposite an encoder of the wheel bearing unit which can rotate with respect to the sensor about the axis of rotation of the wheel bearing unit. The wheel bearing unit has at least a first row of roller bodies and a second row of roller bodies which is adjacent to the first row in the axial direction of the axis of rotation, and the bearing ring engaging at the same time around at least one of the rows.

BACKGROUND OF THE INVENTION

Such arrangements are described in U.S. Pat. No. 5,997,182. One of the arrangements provides a seat of the sensor in the outer bearing ring. The sensor is mounted here in a radial through-hole in the outer bearing ring and engages between the rows of roller bodies. A disadvantage with such a solution is in particular the fact that when the sensor mounted in the bearing ring is removed, foreign bodies can get into the interior of the wheel bearing unit via the through-hole. These foreign bodies may, under certain circumstances, penetrate between the roller bodies and the raceways of the bearing and shorten the service life of the bearing. Furthermore, the wheel bearing unit takes up a relatively large amount of axial installation space since there must be axial free space for the sensor between the rows.

In a further arrangement for nondriven vehicle wheels according to U.S. Pat. No. 5,997,182, the sensor is seated in a housing and is aligned axially with the encoder. The housing is complex to mount with a plurality of individual parts on a flange drilled hole of the outer bearing ring and requires a relatively large amount of axial and radial installation space, which is not always available. Such an arrangement of the sensor is not suitable, or is suitable for use only to a certain degree, on wheel bearing units for driven vehicle wheels since there is not sufficient installation space available.

SUMMARY OF THE INVENTION

The object of the invention is therefore to arrange one or more sensors in a wheel bearing unit in such a way that less axial and radial installation space is taken up for the sensor, and that the previously described disadvantages are avoided. The object of the invention is also to configure the sensor arrangement in a way which eases mounting and removal.

The object is achieved according to the features disclosed below. In addition, there is a lever fixed to the outer bearing ring, fixing the sensor to the bearing ring. The lever points in the axial direction of the bearing unit, engaging at least partially over the bearing ring in the radially outward direction. The lever bears against the bearing ring in the radially outer direction. The lever is fixed to the bearing ring by a bolt.

The invention provides an arrangement of a sensor which takes up only a small amount of installation space. The sensor is preferably integrated into a housing. The housing is manufactured either from suitable lightweight metals and their alloys, from steel or steel plate or from plastic. The sensor can be mounted in the housing or can be nondetachably fixed to the housing, for example, it can be partially let into plastic or at least partially encapsulated by plastic by injection molding.

The term encoder stands for one or more single-piece or multipiece encoders which is/are arranged on the circumference of the bearing axis. The encoder is alternately polarized and made of magnetized material. Examples of such materials are plastics such as polyamides to which magnetized raw material such as bainite ferrite or strontium ferrite is added, or plastics which have magnetizable inserts. Alternatively, the encoder is formed from magnetized or ferromagnetic metal, for example comprised of sheet metal, or is formed in a solid fashion.

One or more sensors, which are arranged outside above or axially with respect to the sealing arrangement and the encoder, taps or tap the signals of the encoder, regardless of possible radiation from the signals which are scattered in different directions, radially in the axial direction depending on the arrangement and alignment of the sensor faces which correspond to one another, or taking into account the angle of inclination of the cone, or transmits/transmit/receive signals in the direction of the encoder. The sensor or sensors is/are seated either on the bearing ring, e.g. on the outer bearing ring, which cannot rotate with respect to the rotating bearing ring, e.g. the inner bearing ring, or the sensors are fixed to the vehicle in some other way. At the same time, the term sensor includes all the conceivable sensor components, and signal-transmitting components, of an electrical and electronic nature which are suitable for being used in chip form or in other circuits in sensor units of wheel bearings.

The encoder is provided with a signal-absorbing, signal-reflecting or signal-generating sensor face, which is thus an active encoder face, turned in the direction of the sensor. The active encoder face points radially or axially in the outward direction or forms an (outer) generated face of a circular frustum. The active surface or face of the encoder is preferably formed on a single-piece encoder in the form of a rotationally symmetrical ring, or is comprised of a plurality of segments on such a frustum. The encoder is arranged on the rotating bearing ring (inner bearing ring) by means of a carrier which is preferably formed from sheet metal.

The encoder is arranged outside the intermediate space of the wheel bearing unit. The intermediate space of the bearing is predefined by the geometry of the outer bearing ring and the shape of the inner bearing ring. The intermediate space is bounded radially by the inner generated face of the narrower, usually outer, bearing ring and by the outer generated face of the wider, usually inner, bearing ring. The roller bodies and the cages of the bearing are arranged in the intermediate space. The intermediate space ends axially at imaginary planes which are aligned perpendicularly with the bearing axis and which proceed from the end faces of the bearing ring (optionally inner ring or outer ring) which is narrowest in its axial width. The inner ring is generally wider than the outer ring and thus penetrates at least one of these planes on that side of the bearing on which the encoder adjoins the intermediate space. The encoder optionally adjoins the outer ring or the intermediate space in the axial direction and at the same time engages around the circumference of the inner ring.

The arrangement of the encoder outside the intermediate space provides the advantage that the encoder can be provided with a significantly larger active surface. The gain in installation space can be additionally utilized for an optimum configuration of the seal since only a small amount of radial installation space for the installation of a seal is available in any case in the intermediate space.

The sealing arrangement which is protected with a cover plate and into which the encoder is integrated is protected with all its components against external environmental influences in an optimum way. The cover plate is generally constructed in the form of a cover cap and is optionally formed preferably from ferromagnetic iron plate or steel plate depending on the further functions in addition to the covering function. The cover element and the carriers of the sealing arrangement or of the encoder made of plate metal are preferably cold formed by cold working such as bending, rolling, drawing, stamping and punching. The cover element supports the sealing function of the sealing arrangement of the bearing.

The sensor arrangement is provided for motor vehicle wheel bearing sets of all conceivable embodiments. This relates in particular to two-row and four-row bearing sets and also to all conceivable wheel bearing sets with rollers or balls as roller bodies, in particular in an angular roller bearing embodiment or angular ball bearing embodiment. The wheel bearing sets have either single-piece bearing rings with raceways for all of the rows, divided bearing rings, or one bearing ring for each row, as well as combinations of these above-mentioned configurations. The inner bearing rings can be rotated with respect to the outer bearing ring or rings. The outer bearing ring is fixed to the vehicle with respect to the rotatable bearing ring. Inner bearing rings are preferably seated on a hub, the bearing being fixed for example free of play to the hub by means of a flanged edge. Alternatively, the bearing can be set free of play by means of all conceivable variants for play-free setting such as axial prestressing by means of a nut.

The outer bearing ring is optionally formed in one piece with one or more flanges in order to attach the wheel bearing unit at the vehicle end or wheel end, or these bearing rings are fitted into a corresponding flange housing. The term outer bearing ring accordingly includes either an outer bearing ring with at least one radial flange or the like or a flange housing which holds at least one outer ring of the wheel bearing unit.

The sealing arrangement is preferably embodied as a cartridge seal. The essential elements of the seal arrangement are combined to form a self-supporting component made of carriers, cover cap, seal and encoder (cartridge seal). The stock holding, transportation as well as the mounting in the bearing unit are thus simplified. The sealing arrangement and the sensor arrangement according to the invention can be replaced with sealing arrangements according to the prior art without changes having to be made to the design of the bearing unit because of the installation space.

Other features and advantages of the present invention will become apparent from the following description of the invention which refers to the accompanying drawings.

BRIEF DESCRIPTION OF THE DRAWINGS

Further configurations of the invention and exemplary embodiments of the invention are explained in more detail below with reference to drawings, in particular.

DESCRIPTION OF PREFERRED EMBODIMENTS

Figure 1:
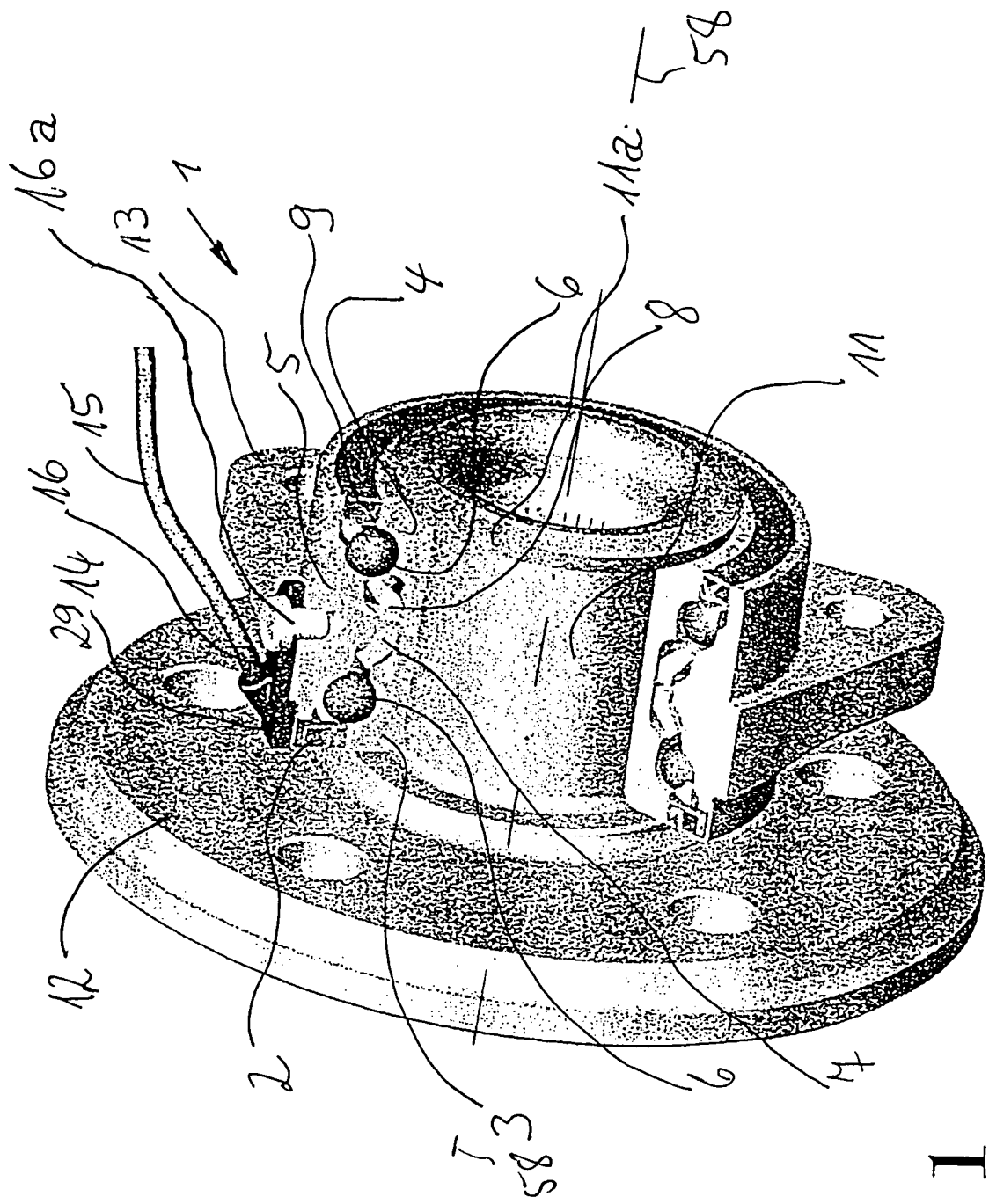
FIG. 1 is an overall view of a wheel bearing unit, partially in section, with a sensor arrangement according to the invention.

FIG. 1 shows a partially section overall view of a wheel bearing unit 1 with a sensor arrangement 29 according to the invention mounted thereon. The wheel bearing unit 1 has a wheel bearing set comprised of two inner wheel bearings 3 and 4 and of an outer bearing ring 5, two rows of roller bodies 6 in the embodiment of balls and cages 7 and 8. The inner bearing rings 3 and 4 are seated on a hub 11. The wheel bearing unit is constructed in the form of a two-row angular ball bearing and is prestressed free of play by means of a flanged edge 11a of the hub 11. A flange 12 for attaching a vehicle wheel (not illustrated) is constructed in one piece with the hub 11. The vehicle-end attachment of the wheel bearing unit 1 is provided by a further flange 13. As a result, the outer bearing ring 5 is fixed in terms of rotation to the vehicle (not illustrated), while the inner bearing rings 3 and 4 can rotate relative to the outer bearing ring 5.

The wheel bearing set is sealed in one axial direction by a cartridge seal 9, and in the other axial direction by the sealing arrangement 2. The sensor arrangement 29 comprised of an encoder 10 and a sensor 14 is assigned to arrangement 2. The encoder 10 is integrated into the sealing arrangement 2.

The sensor 14 is seated radially outside the sealing arrangement 2 and radially above the sealing arrangement 2. A connection 15 leads to the vehicle from the sensor 14. The sensor 14 is fixed to the outer bearing ring 5 by a lever 16. The lever 16 proceeds axially from the sensor 14 and extends partially radially over the outer bearing ring 5. A bolt 16a which is optionally pressed in, screwed in or seated securely in some other way holds the sensor 14 against the outer bearing ring 5 by means of the lever 16. The attachment of the sensor 14 on the outer bearing ring 5 which is fixed to the vehicle is advantageous since the wheel bearing unit can be supplied in premounted form together with the sensor or sensors as a module simplifying the mounting on the vehicle. It is possible to lay the connection 15 in an optimum way between the in any case narrow intermediate space between the vehicle wheel and the axle suspension means.

Figure 2:
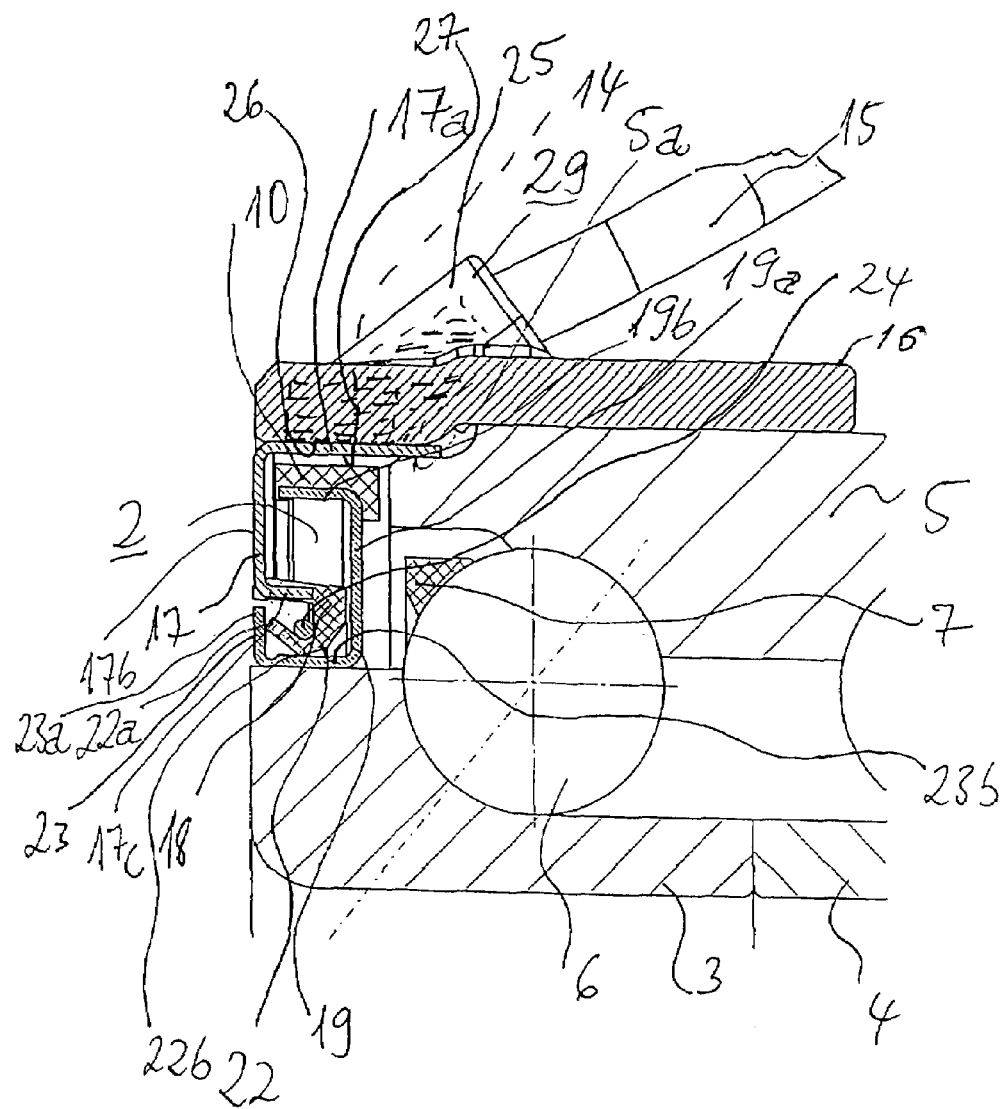
FIG. 2 is a sectional and partial view of an exemplary embodiment of a radial sensor arrangement and of a sealing arrangement.

The sensor arrangement 29 and the sealing arrangement 2 are illustrated in detailed form in a sectional view in FIG. 2. The sealing arrangement 2 has a cover plate 17 to which a seal 18 is fixed. Furthermore, the sealing arrangement has a carrier 19 with the encoder 10. The encoder 10 is a ring comprised of plastic with attachments or inserts which are optionally magnetically polarized. The sealing arrangement 2 is covered for the most part by a cover plate 17. The cover plate 17 is fixed to the outside of a face section 5a of the outer bearing ring 5. For this purpose, the cover plate 17 is seated with a hollow cylindrical section 17a pressed onto the face section 5a, and the section 17a extends firstly between the sensor 14 and the encoder 10 away from the outer bearing ring 5 in the axial direction. Over the rest of its course, the cover plate 17 extends radially inwards to a disk-shaped section 17b. The encoder 10 is covered on the outside in the radial and axial directions, and the intermediate space 21 is covered on the outside in the axial direction, by means of the section 17b, and protected against soiling.

The cover plate 17 finally ends in a hollow cylindrical section 17c which is bent away from the section 17b and extends in the direction of the roller bodies 6. The seal 18 is fixed to the section 17c. The seal 18 has a sealing lip 22 with two sealing edges 22a and 22b. The sealing edge 22a bears against a dirt deflector 23 in the axial direction.

The dirt deflector 23 is an angled ring, one of whose limbs 23a is directed away from the inner bearing ring 3 in the radial outer direction. In addition, the dirt deflector 23 is formed in one piece with the second carrier 19 comprised of plate metal and for this purpose is connected to the carrier 19 via the other limb 23b. The second sealing edge 22b bears against the limb 23b in the radial direction, prestressed to an intensified degree by the action of an endless spiral spring.

The second carrier 19 is continuous with the dirt deflector 23 at the limb 23b and thus firstly extends radially in the direction of the roller bodies 6, being located at least partially radially between the seal 18 and the inner bearing ring 3, and is then bent radially in the outward direction. In the process, the carrier 19 extends radially, in the form of a disk-shaped section 19a, between the roller bodies 6 and the cage 7 on one axial side, and the seal 18, the dirt deflector 23 and the cover plate 17 on the other axial side, in the axially outward direction. A hollow cylindrical supporting section 19b, which points axially in the direction of the cover plate 17, is seated radially between the sealing arrangement 2 and the section 17a of the encoders 10, and is bent from the section 19a.

The sensor 14 is embedded in a housing 25 made of plastic. Its active sensor face 26 points radially inwards and is aligned with the active, radially outwardly directed, cylindrical, outer generated face/encoder face 27 of the encoder 10 and bears radially against the cover plate 17. The lever 16 extends from the housing 25, bent at a right angle at first and then axially. The lever 16 bears radially against the outer bearing ring 5.

Figure 3:
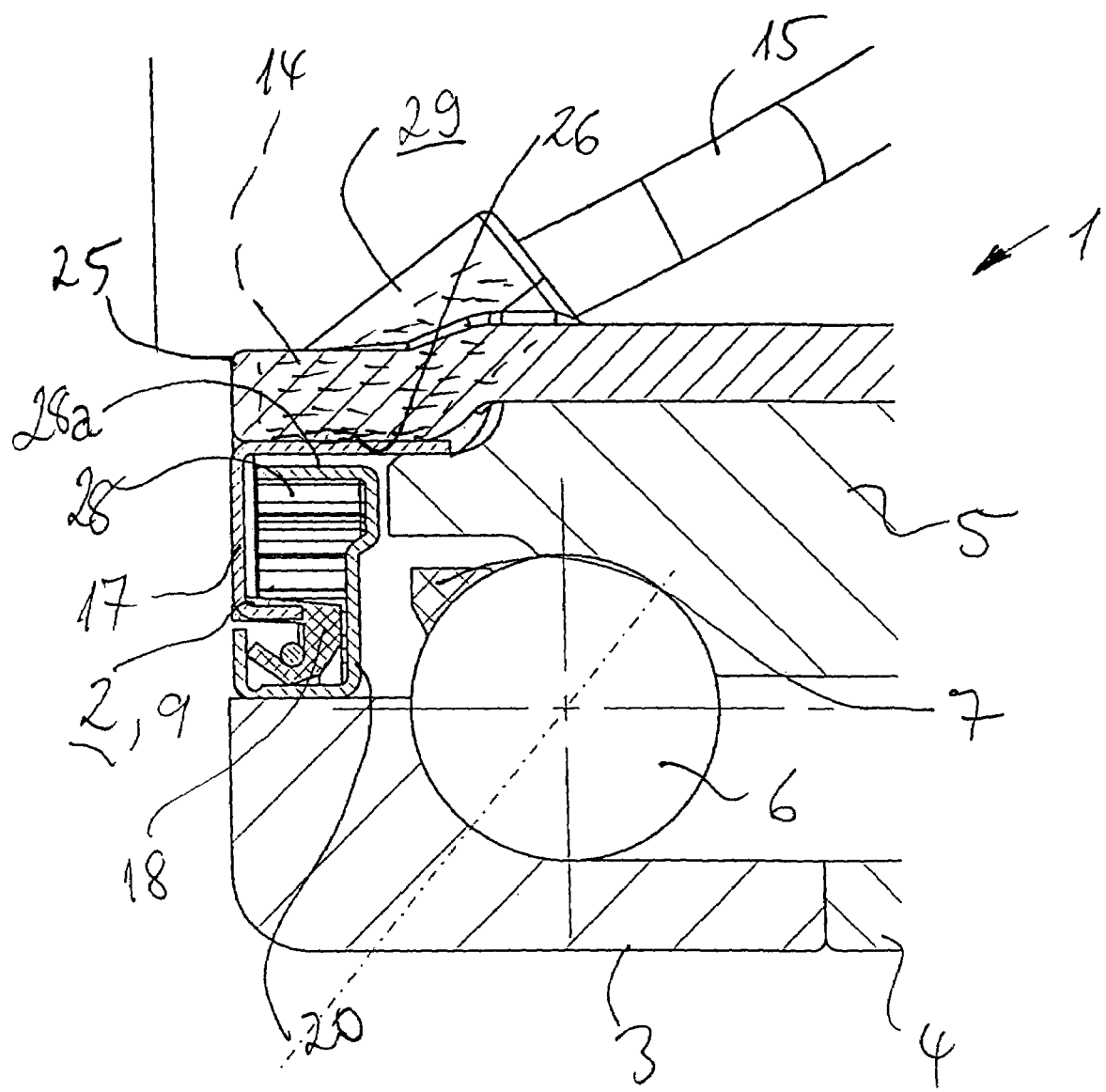
FIG. 3 shows an alternative to FIG. 2 with an encoder made of metal plate.

FIG. 3 shows the wheel bearing unit 1 according to FIG. 1 in which, however as an alternative to FIG. 1, an encoder 28 is seated instead of the encoder 10. The encoder 28 is provided with an active encoder face 28a which is turned radially outward and is comprised of the sheet metal of the carrier 20 of the encoder 28.

Figure 5:
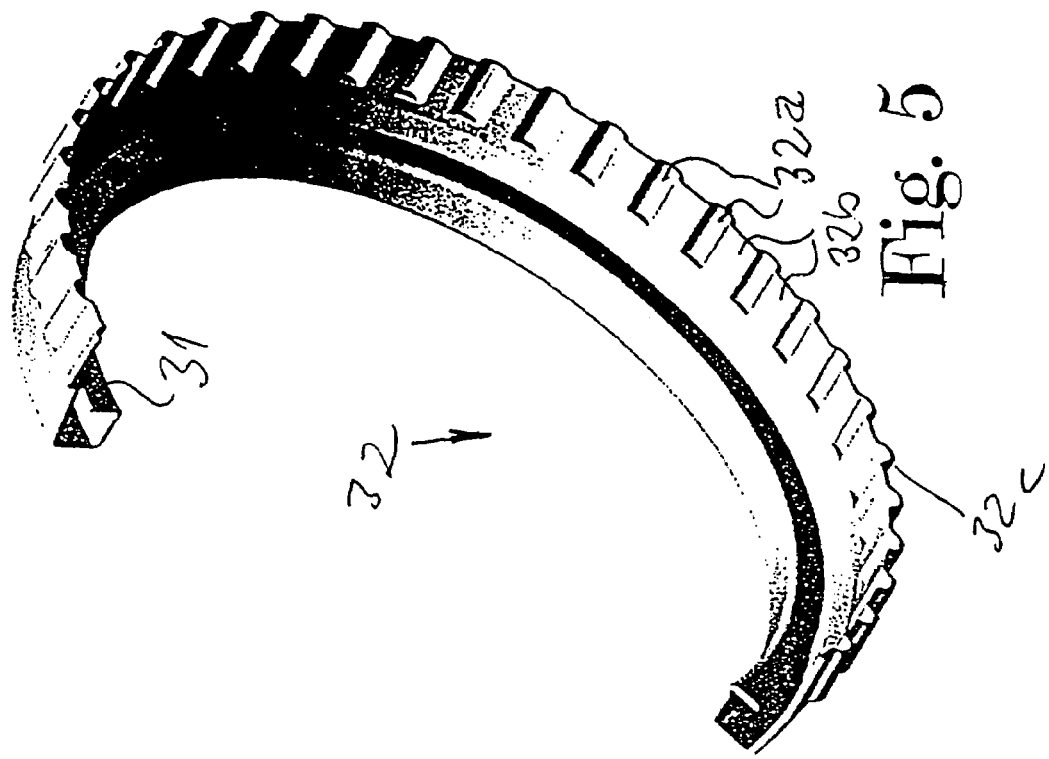
FIGS. 4 and 5 show alternative exemplary embodiments of encoders made of metal plate or of plastic, in a partially sectional overall view of the individual parts thereof.
Figure 4:
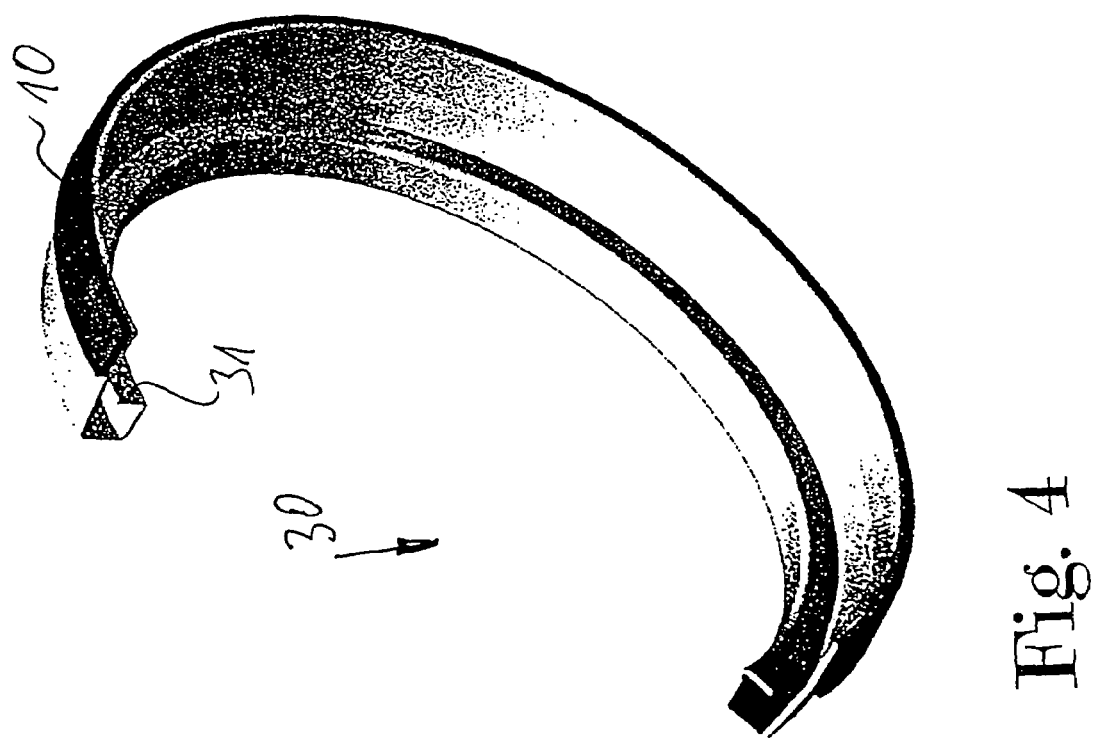

FIGS. 4 and 5 show alternative configurations of a carrier 30 and of an encoder 32. The carrier 30 according to FIG. 4 accommodates an encoder 10 made of a plastic. Magnetizable particles are dispersed throughout the plastic. The carrier 30 is constructed in one piece with the dirt deflector 31. The encoder 32 has elevations 32a which are shaped out of the sheet metal of the encoder in the radially outer direction, have the same shape as one another, are arranged at a uniform pitch with respect to one another on the circumference of the encoder 32 and are separated from one another by depressions 32b. Alternatively, encoders are also provided in which the depressions 32b and the elevations 32a are replaced by cutouts/punchouts and webs on the circumference (counting ring). The active encoder face 28c is turned radially outwards and profiled by the depressions 32b and the elevations 32a.

Figure 6:
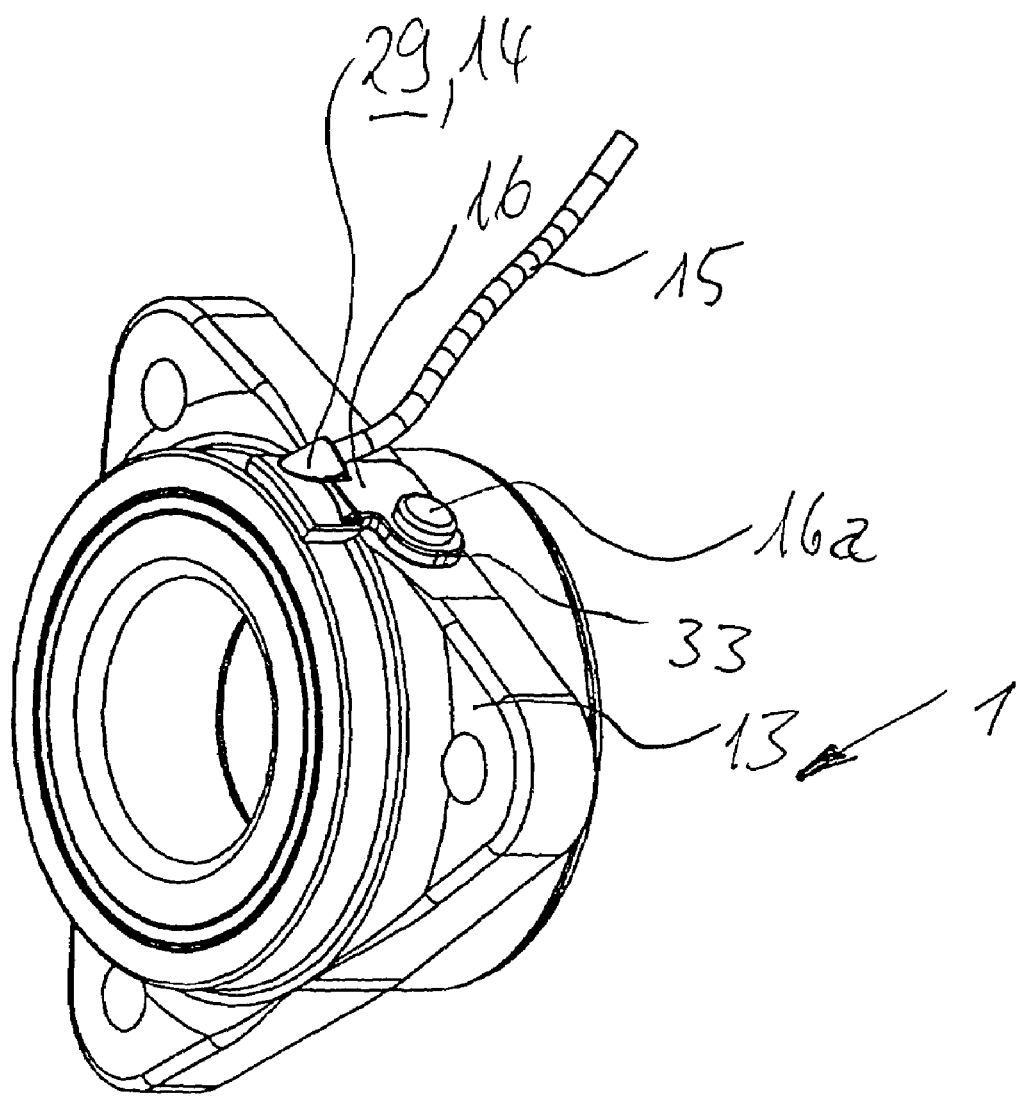
FIG. 6 is an overall view of the wheel bearing unit 1 with an alternative configuration of the lever for attaching the sensor to the housing.

FIG. 6 shows once more the wheel bearing unit 1 in an overall view. The lever 16 is alternatively of angled design. A limb 33 of the lever 16 points here in a tangential direction. The bolt 16a engages through the limb 33 and is pressed into the flange 13.

Figure 7:
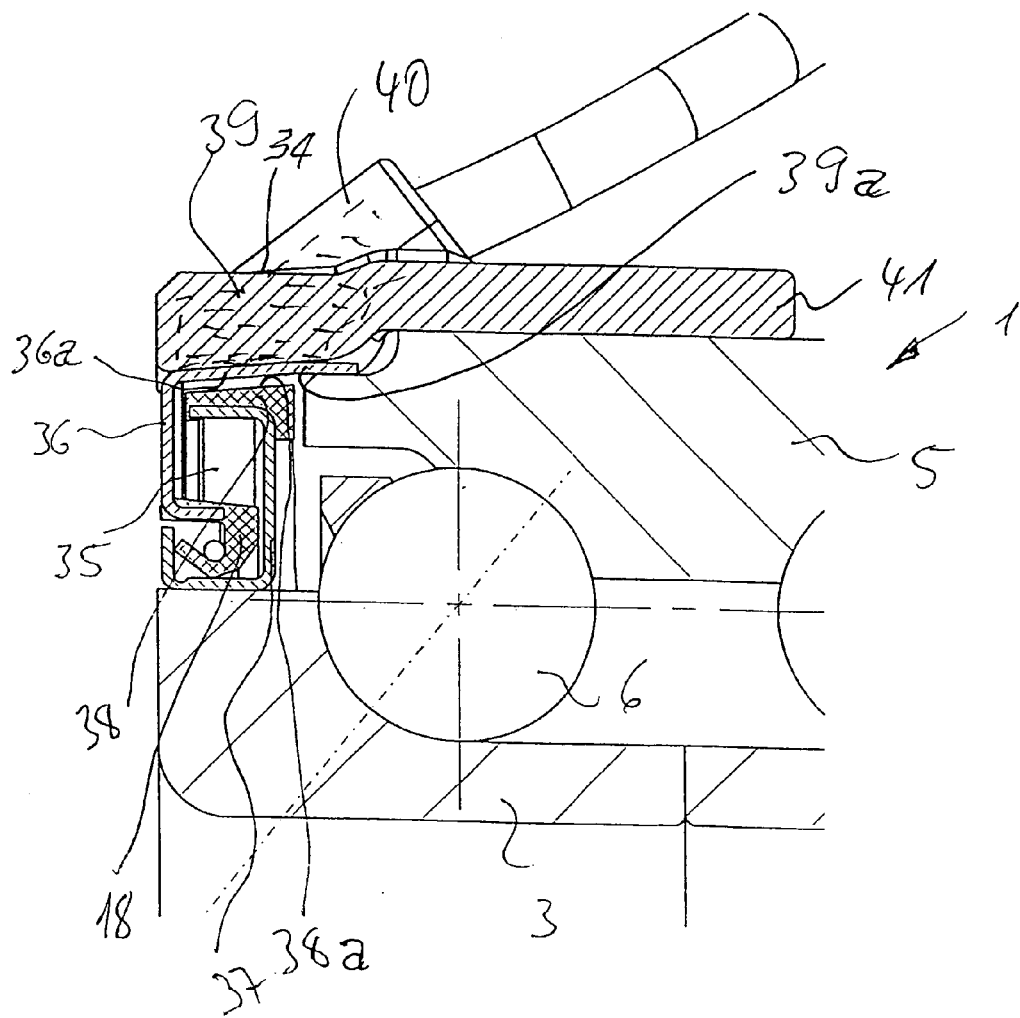
FIG. 7 shows an alternative to FIG. 2, in which the sensor lies opposite an encoder with a conically shaped active surface.

FIG. 7 shows the wheel bearing unit 1, having a sensor arrangement 34 and a sealing arrangement 35. The sealing arrangement 35 is formed from a cover plate 36, on which the seal 18 is seated, and from a carrier 37, on which an encoder 38 with an active encoder face 38a is seated. The seal 18 bears—in a way which is analogous to its position in the sealing arrangement 2—against the carrier 37. The active encoder face 38a is the outer generated face of a circular frustum. Opposite the active encoder face 38a there is optionally an active sensor face 39a—which is inclined at the cone angle of the encoder face 38a or is aligned radially—of a sensor 39. The section 36a of the cover plate 36 is embodied in the form of a hollow cone, corresponding to the cone angle. The sensor 39 is embedded in a housing 40 which is fixed, by an axially extending lever 41, to the outer bearing ring 5.

Figure 8:
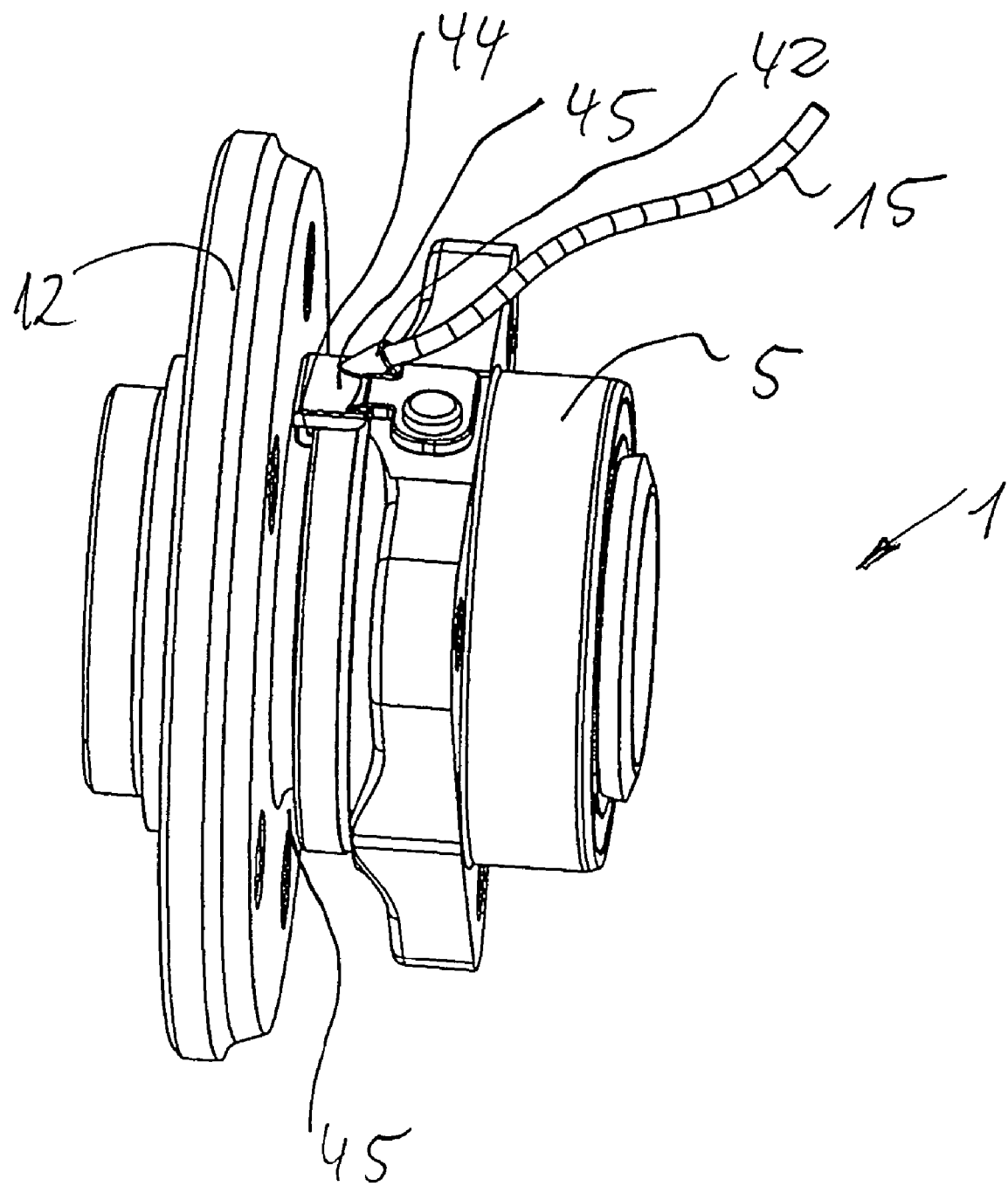
FIG. 8 is an overall view of a wheel bearing unit, having a sensor arrangement in which the sensor lies axially opposite the active face of the encoder.
Figure 9:
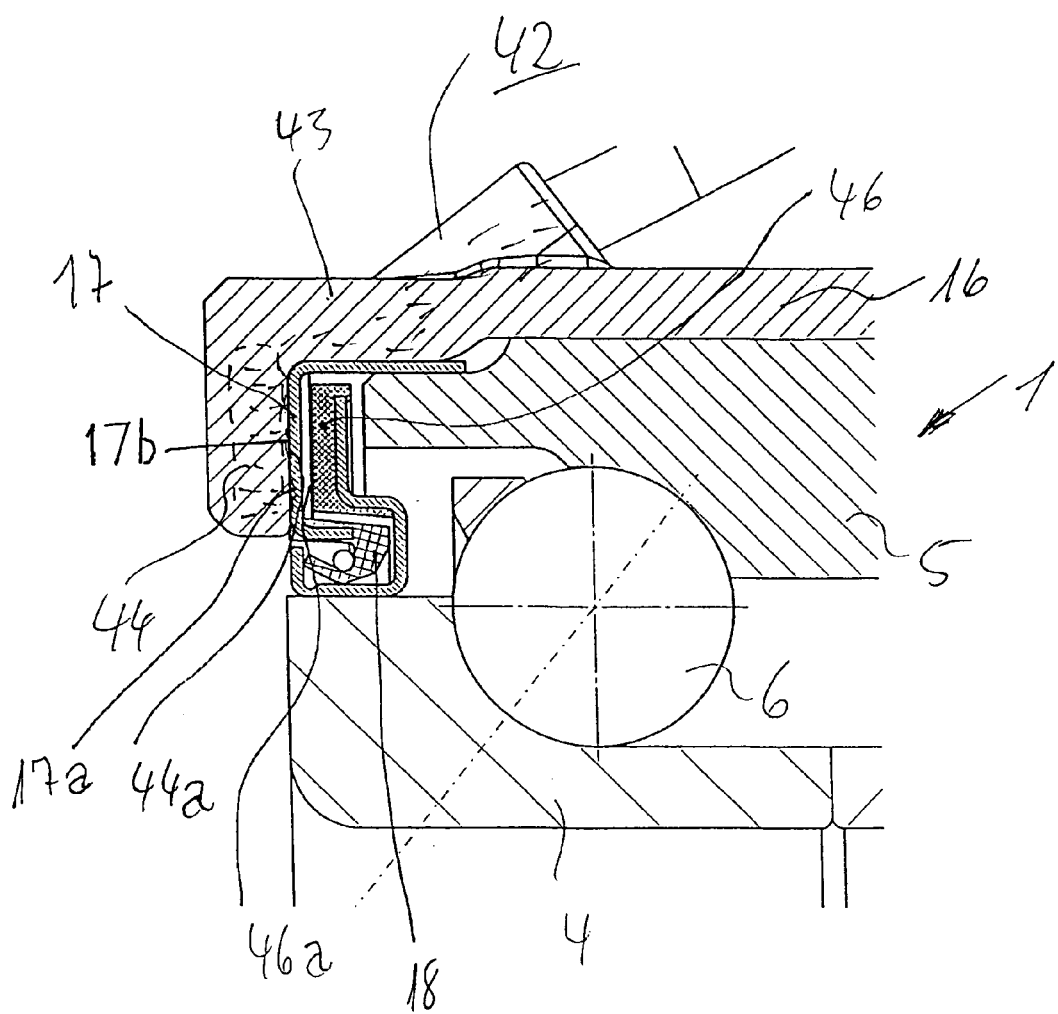
FIG. 9 is a sectional and partial view of the exemplary embodiment according to FIG. 8 with an axial sensor arrangement and a sealing arrangement.

FIGS. 8 and 9 show the wheel bearing unit 1 with a sensor arrangement 42 in which the sensor 44 which is surrounded by a housing 43 engages radially in the axial gap 45 between the flange 12 and the outer bearing ring 5. According to FIG. 9, the sensor 44 is located axially opposite an axially aligned encoder 46. The active sensor face 44a and the active encoder face 46a are directed axially one toward the other. The section 17b of the cover plate 17 extends perpendicularly between them. The sensor 44 bears radially and axially against the cover plate 17. The housing 43 is bent radially by the position of the sensor 44. Furthermore, the housing 43 is attached to the outer bearing ring 5 by the lever 16 in the way described above.

Figure 10:
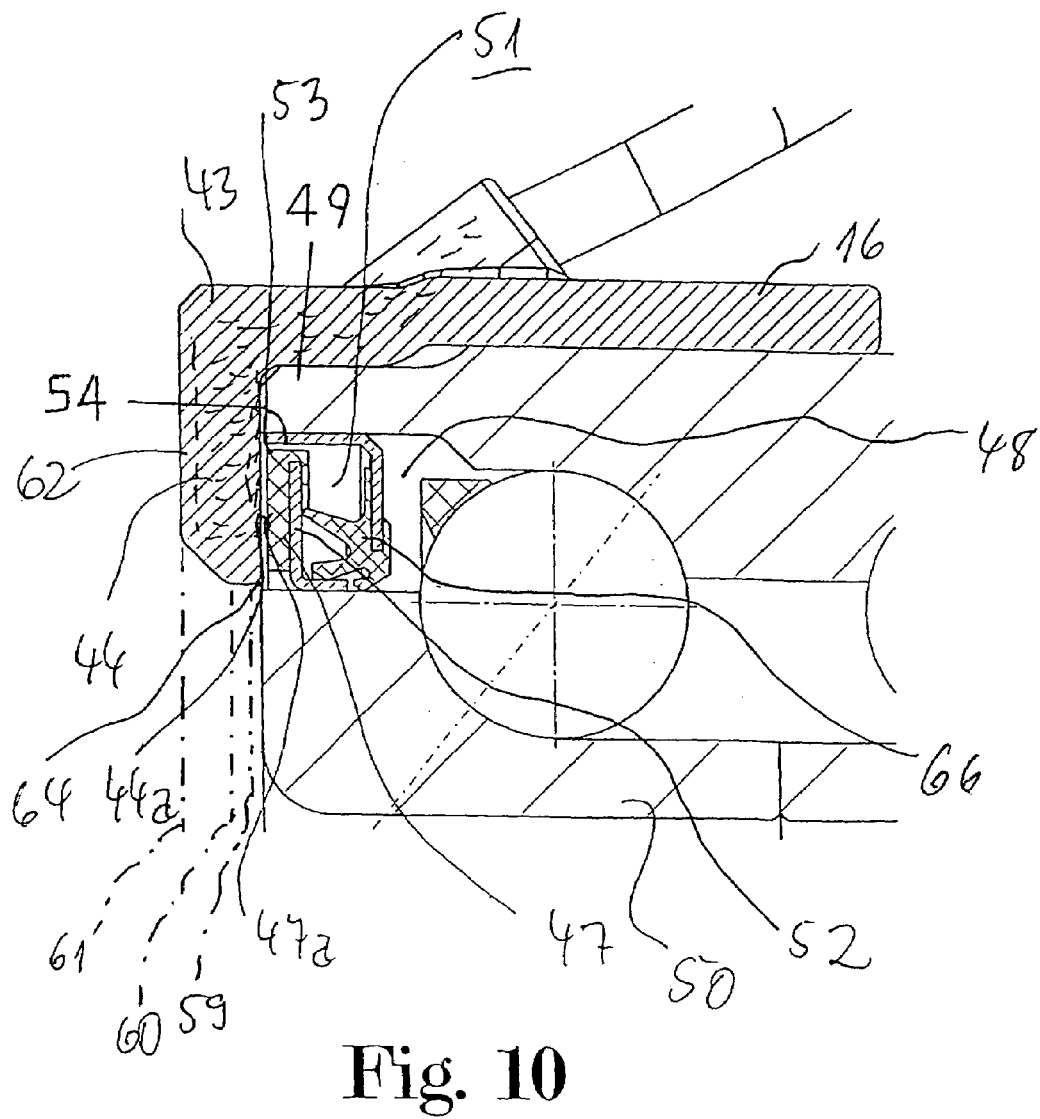
FIG. 10 shows an alternative configuration of FIG. 9 in which an encoder is arranged axially between a sealing arrangement and the sensor.

In FIG. 10, the sensor 44 is located axially opposite an encoder 47 which is arranged in an intermediate space 48 of a wheel bearing. An outer bearing ring 49 engages around the encoder 47, and at the same time engages itself around an inner bearing ring 50. The encoder 47 is aligned with its active encoder face 47a with the active sensor face 44a in the axial direction. In contrast to the configuration of the invention illustrated in FIG. 9, no cover plate is arranged between the sensor 44 and the encoder 47. The active faces 44a and 47a are located one opposite the other, separated from one another only by an axial air gap 53. In this configuration, the encoder 47 is thus arranged axially between the sensor 44 and a sealing arrangement 51. The sealing arrangement 51 is formed from a carrier 52 and a seal 66 with three sealing lips. The carrier 52 is fitted with the encoder 47. Of the sealing lips, two bear against the carrier 52, and one against the inner bearing ring 50. The seal is seated securely with a carrier 54 in the outer bearing ring 49.

Figure 11:
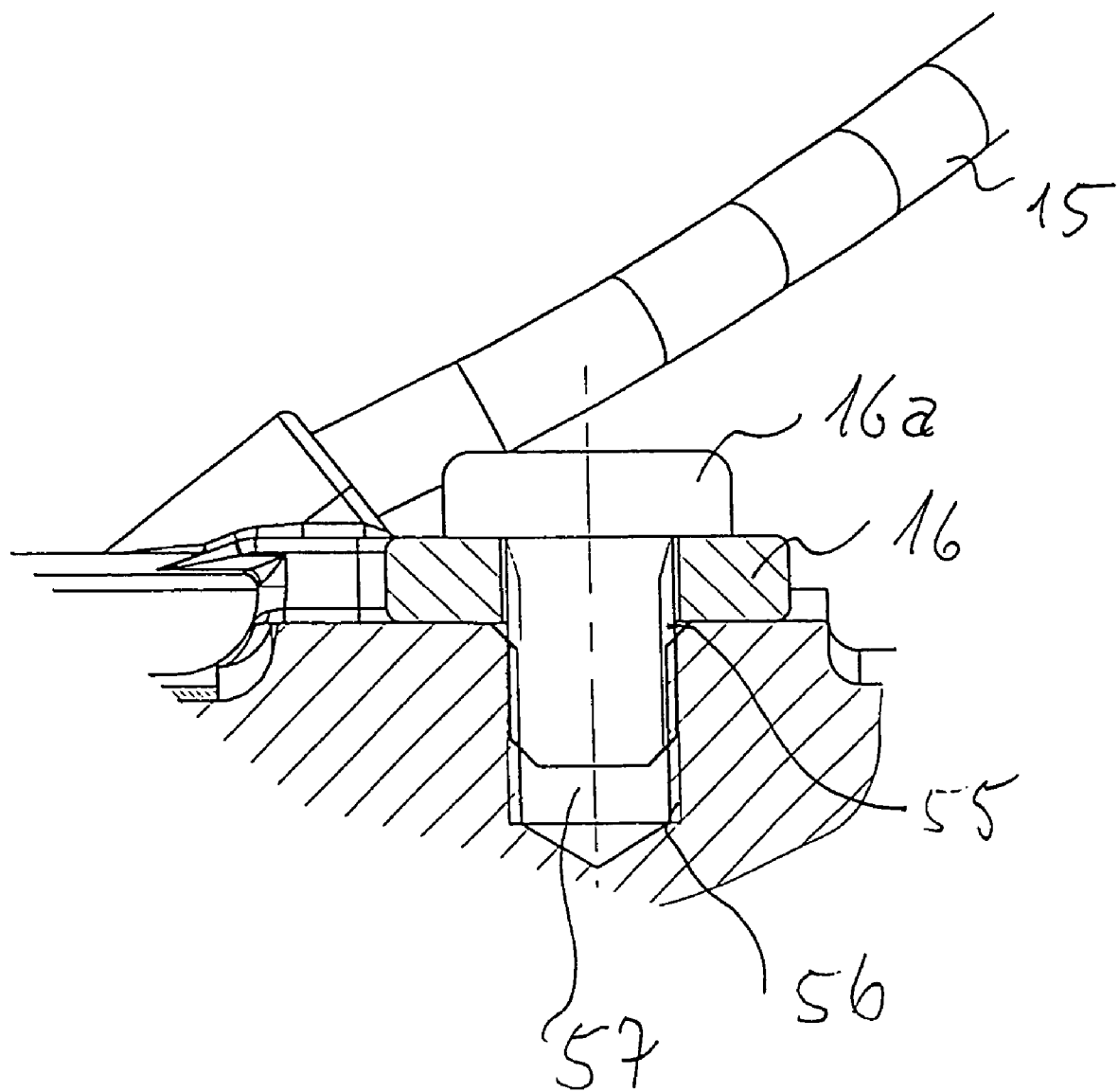
FIG. 11 is a configuration of a detail of the invention in which the bolt for holding the sensor is screwed radially into the outer bearing ring.
Figure 12:
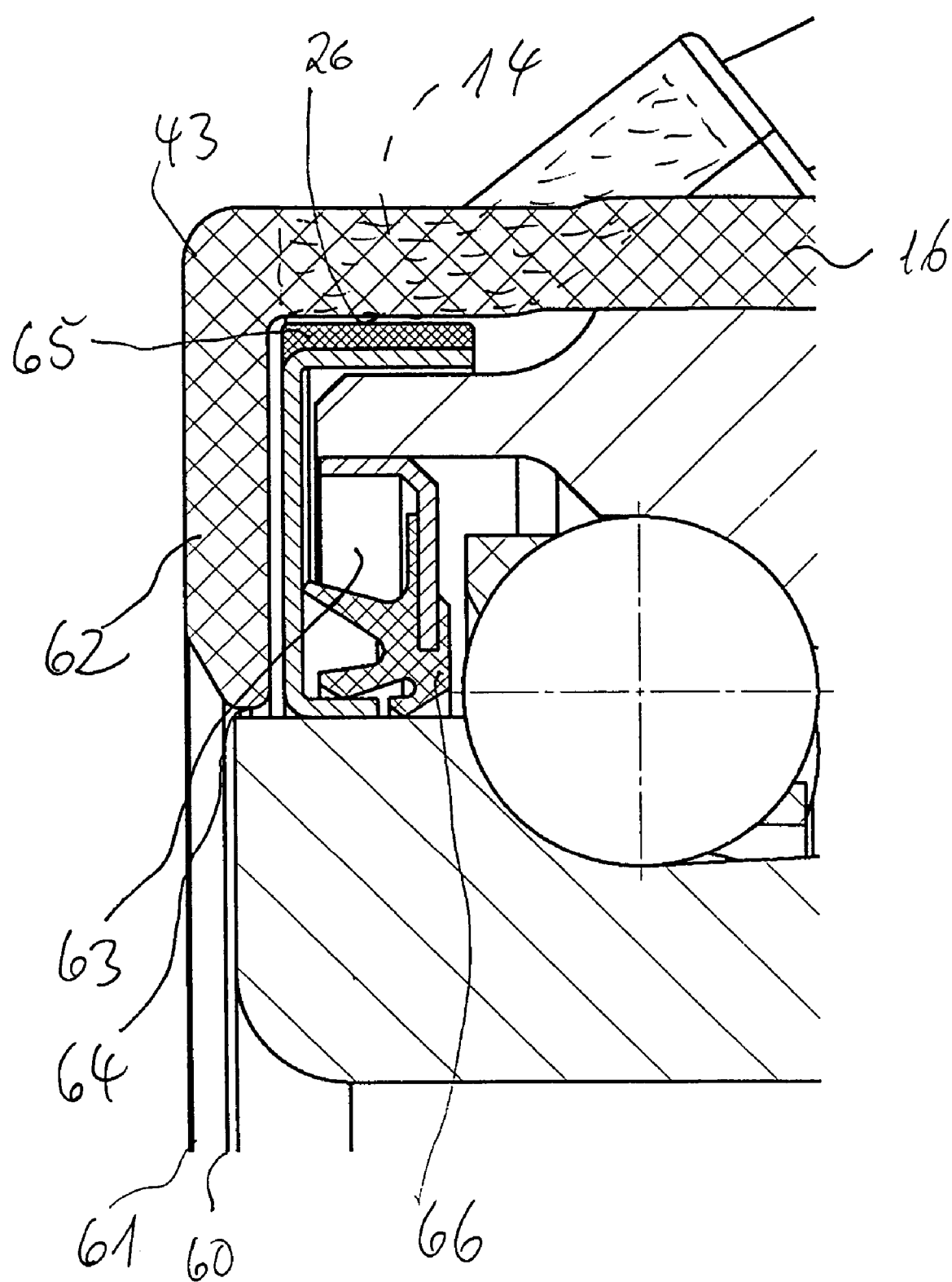
FIG. 12 is an alternative configuration of FIG. 9 in which an encoder is arranged radially between a sealing arrangement and the sensor.

FIGS. 11 and 12 describe further configurations of the invention according to which the lever 16 is constructed in one piece with a housing 43, the housing 43 at least partially engaging around the sensor 14, 44 and at least one part of the housing 43 and the sensor 14, 44 being located opposite the encoder 47, 65 in the axial or radial directions, separated only by an air gap. The housing 43 is in this case a cover cap into which the sensor 44 according to FIG. 10 or the sensor 14 according to FIG. 12 is integrated. It is possible, for example, to mount it in place or encapsulate it by injection molding. In this case, the radially perpendicular part of the housing 43 is in this case a section 62 in the form of an annular ring, as indicated by the dot-dashed lines 59, 60, 61 in FIG. 10 and illustrated by the body edges 59a, 60a, 61a drawn by unbroken lines in FIG. 12. The section 62 in the form of an annular ring covers the sealing arrangement 51 in FIG. 10 and the sealing arrangement 63 in FIG. 12, with the exception of the ring gap 64, in the axial direction. The housing 43 is accordingly, with the section 62, a pre-seal for the sealing arrangements 51 and 63. In this arrangement, the sensor 44 in FIG. 10 is aligned axially with the encoder 47, and the sensor 14 in FIG. 12 is aligned radially with the encoder 65.

FIG. 11 shows an alternative way of attaching the bolt 16a in the outer bearing ring 5. The bolt 16a is provided with a thread 55 with which the bolt 16a is screwed into a corresponding thread 56 of the blind hole 57.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An arrangement of a sensor on a wheel bearing unit comprising:
    the wheel bearing unit having at least a first row of rolling bodies and a second row of roller bodies, the second row being adjacent to the first row in an axial direction of an axis of rotation of the unit;
    an outer wheel bearing ring around the roller bodies, the bearing ring engaging around at least one of the rows of the rollerbodies;
    an encoder in the wheel bearing unit;
    a sensor fixed to the outer wheel bearing ring and located at a distance from the bearing ring, the sensor being located opposite the encoder of the wheel bearing unit, the encoder being capable of rotating with respect to the sensor about an axis of rotation of the wheel bearing unit;
    an angled portion fixing the sensor to the bearing ring, the angled portion pointing in one of the axial directions of the axis of rotation, the angled portion engaging at least partially over the bearing ring in the radially outward direction, and the angled portion bearing at least partially against the bearing ring in the radially outward direction;
    a bolt fixing the angled portion to the bearing ring, the bolt being fixed in the bearing ring.

2. The arrangement as claimed in claim 1, wherein the bolt points radially with respect to the direction of the axis of rotation.

3. The arrangement as claimed in claim 1, wherein the bolt has a thread, a threaded hole in the bearing ring into which the bolt is screwed.

4. The arrangement as claimed in claim 1, further comprising a housing at least partially surrounding the sensor; wherein the angled portion is formed in one piece with the housing.

5. The arrangement as claimed in claim 4, wherein the housing is made of at least one plastic, and the sensor is encapsulated by the housing.

6. The arrangement as claimed in claim 1, wherein the sensor includes an active sensor face which is directed in one of the axial directions,
    the encoder having an annular active encoder face; and
    the active sensor face being located axially opposite the annular active encoder face.

7. The arrangement as claimed in claim 1, wherein the sensor has an active sensor face directed in the radially inward direction and is arranged radially on the outside above the encoder; the encoder having at least one active encoder face which is aligned radially with the active sensor face, the active sensor face being located opposite the at least one active encoder face, the at least one encoder face being able to rotate about the axis of rotation.

8. The arrangement as claimed in claim 1, wherein the sensor has an active sensor face which is directed in the inward direction and is arranged radially on the outside above the encoder, the encoder having at least one active encoder face which is aligned with the active sensor face, the active sensor face being located opposite the at least one active encoder face, the at least one active encoder face being an outer generated face of a frustum which can rotate about the axis of rotation.

9. The arrangement as claimed in claim 1, further comprising a cover plate which extends between the encoder and the sensor, the sensor bearing against the cover plate;
    a sealing arrangement of the wheel bearing unit comprising a seal fixed to the cover plate, a carrier on which the encoder is fitted and the seal bearing against the carrier.

10. The arrangement as claimed in claim 1, further comprising a housing at least partially surrounding the sensor, at least part of the housing and sensor being located opposite the encoder, separated therefrom by an air gap; and the angled portion being in one piece with the housing.

11. The arrangement as claimed in claim 10, wherein the sensor is spaced axially apart from the encoder and is located opposite the encoder; the arrangement further comprising
    a carrier for the encoder; and
    a seal fixed to the bearing ring in a nonrotating fashion and bearing against the carrier.

12. The arrangement as claimed in claim 1, wherein the sensor is spaced apart from the encoder in a radial direction and is located opposite the encoder; the arrangement further comprising
    a carrier for the encoder; and
    a seal fixed to the bearing ring in a nonrotating fashion and bearing against the carrier;

* * * * *